(12) United States Patent
Steinbrecher

(10) Patent No.: US 7,249,711 B1
(45) Date of Patent: Jul. 31, 2007

(54) LOW-POWER REMOTELY READABLE SENSOR

(75) Inventor: Donald H. Steinbrecher, Brookline, MA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 338 days.

(21) Appl. No.: 11/061,164

(22) Filed: Feb. 25, 2005

(51) Int. Cl.
*G06K 7/08* (2006.01)

(52) U.S. Cl. ...................... 235/451; 235/443

(58) Field of Classification Search ................ 235/451, 235/439, 440, 443; 340/572.1, 572
See application file for complete search history.

(56) References Cited

U.S. PATENT DOCUMENTS

| | | | |
|---|---|---|---|
| 5,451,938 A | 9/1995 | Brennan | |
| 5,524,034 A * | 6/1996 | Srygley et al. | ............... 377/15 |
| 5,573,611 A | 11/1996 | Koch et al. | |
| 5,724,030 A | 3/1998 | Urbas et al. | |
| 5,821,425 A | 10/1998 | Mariani et al. | |
| 5,825,286 A | 10/1998 | Coulthard | |
| 5,960,844 A | 10/1999 | Hamaya | |
| 6,254,548 B1 * | 7/2001 | Ishikawa et al. | ............. 600/549 |
| 6,369,712 B2 | 4/2002 | Letkomiller et al. | |
| 7,036,734 B2 * | 5/2006 | Baker | ......................... 235/451 |
| 7,059,518 B2 * | 6/2006 | Forster | ....................... 235/385 |

* cited by examiner

*Primary Examiner*—Daniel Stcyr
(74) *Attorney, Agent, or Firm*—James M. Kasischke; Michael P. Stanley; Jean-Paul A. Nasser

(57) ABSTRACT

A plurality of remotely readable sensor apparatus and reader systems for collecting data frames from all apparatus within the reader field of view. Each sensor apparatus converts one or more environmental observable into information signals, converts the information signals into digital data and appends other discriminating digital data as desired to form a digital data frame. The state of a diode, connected to an antenna with the digital data frame, is modulated and a timing apparatus controls the digital-data-frame start times. The modulated states of the diode connected to a sensor-apparatus antenna are chosen so the angle of the antenna reflection coefficient is modulated between two values separated by approximately 180 degrees, so a carrier signal received by the antenna effects a bi-phase modulated signal containing the digital data frame that is reflected by the sensor-apparatus antenna toward the reader receiver antenna.

24 Claims, 4 Drawing Sheets

LOW-POWER REMOTELY READABLE SENSOR

STATEMENT OF GOVERNMENT INTEREST

The invention described herein may be manufactured and used by or for the Government of the United States of America for governmental purposes without the payment of any royalties thereon or therefor.

BACKGROUND OF THE PRESENT INVENTION (1) Field of the Invention

The present invention relates to a sensor system, and a method for operating such a system, which comprises a sensor apparatus for gathering information, converting the information to digital data and communicating such data via an RF encoded signal to a remote reader system. More specifically, this invention relates to a system for remotely reading the current state of one or more sensor apparatus in a reader field of view whereby the reader transmits an RF signal that is received, modulated and re-radiated by each and every sensor apparatus in the reader field of view. The sensor-module, re-radiated RF signals contain discriminating information and digital data frame. The reader, which will nearly simultaneously receive RF signals from every sensor apparatus in the reader's field of view, can use the discriminating information to identify each specific sensor apparatus so that each digital data frame can be addressed according to the specific sensor apparatus transmitting the data frame.

(2) Description of the Prior Art

New battle-space scenarios (the Expeditionary Sensor Grid, for example) include deploying large numbers of unattended sensors that monitor certain aspects of the environment. The sensors must have low power consumption in order to function unattended for long periods. Further, the sensors should be capable of covert operation. That is, the sensors should not be detectable as a result of reflected or self-generated electromagnetic emissions, even in the visible spectrum. However, in order to be useful, the information gathered by the sensors must find its way to regional data-fusion centers for analysis and evaluation. What is needed, therefore, is a covert and versatile sensor system that can be used in a wide range of physical environments.

SUMMARY OF THE INVENTION

Accordingly, the present invention comprises a plurality of remotely readable sensor apparatus and reader systems for collecting data frames from each and every sensor apparatus within the reader field of view. Each sensor apparatus comprises a sensor means for converting one or more environmental observable(s) into information signal(s), a memory means and a digital processor means for converting information signal(s) into digital data and appending such other discriminating digital data as, for example, a time stamp, location stamp and sensor address to form a digital data frame, a modulator means for modulating the state of a diode connected to an antenna with the digital data frame, and a timing means for controlling the digital-data-frame start times. The modulated states of the diode connected to a sensor-apparatus antenna are chosen such that the angle of the antenna reflection coefficient is modulated between two values separated by approximately 180 degrees, such that a carrier signal received by the antenna effects a bi-phase modulated signal containing the digital data frame that is reflected by the sensor-apparatus antenna toward the reader receiver antenna.

The invention includes a reader system which comprises a reader transmitter for generating the carrier signal, a reader antenna for transmitting the carrier signal to the sensor apparatus, a receiving antenna for receiving the reflected signal from the sensor apparatus, a reader receiver for processing the received signal to form a processed received signal, a demodulator for recovering the sensor-apparatus-generated data frame, a processor for saving and fusing the data frames received from a plurality of sensor apparatus, and a means for relaying the fused data to another location.

The present invention also includes a method for remotely sensing environmental data which comprises the steps of collecting a plurality of environmental inputs via at least one sensing means, formatting said plurality of environmental inputs as digital data, collecting said digital data, storing said collected digital data in a memory means as a data frame, said memory means accessible by a sensor system having a sensor antenna, constructing a data packet from said data frame, encoding said data packet to construct a modulation sequence, driving an RF modulator with said modulation sequence, generating a carrier signal with a reader transmitter and directing said carrier signal at said sensor antenna, receiving said carrier signal at said sensor system via said sensor antenna, bi-phase modulating said received carrier signal to produce a reflected signal, receiving said reflected signal with a reader receiver, processing said reflected signal to produce a processed signal, decoding said processed signal to produce said data packet, and recovering said data frame from said data packet.

BRIEF DESCRIPTION OF THE DRAWINGS

These and other features and advantages of the present invention will be better understood in view of the following description of the invention taken together with the drawings wherein.

DETAILED DESCRIPTION OF THE PREFERRED EMBODIMENT(S)

As is described more fully below, the sensor system of the present invention is versatile, covert, and free of reflections and self-generated electromagnetic emissions.

Figure 2:
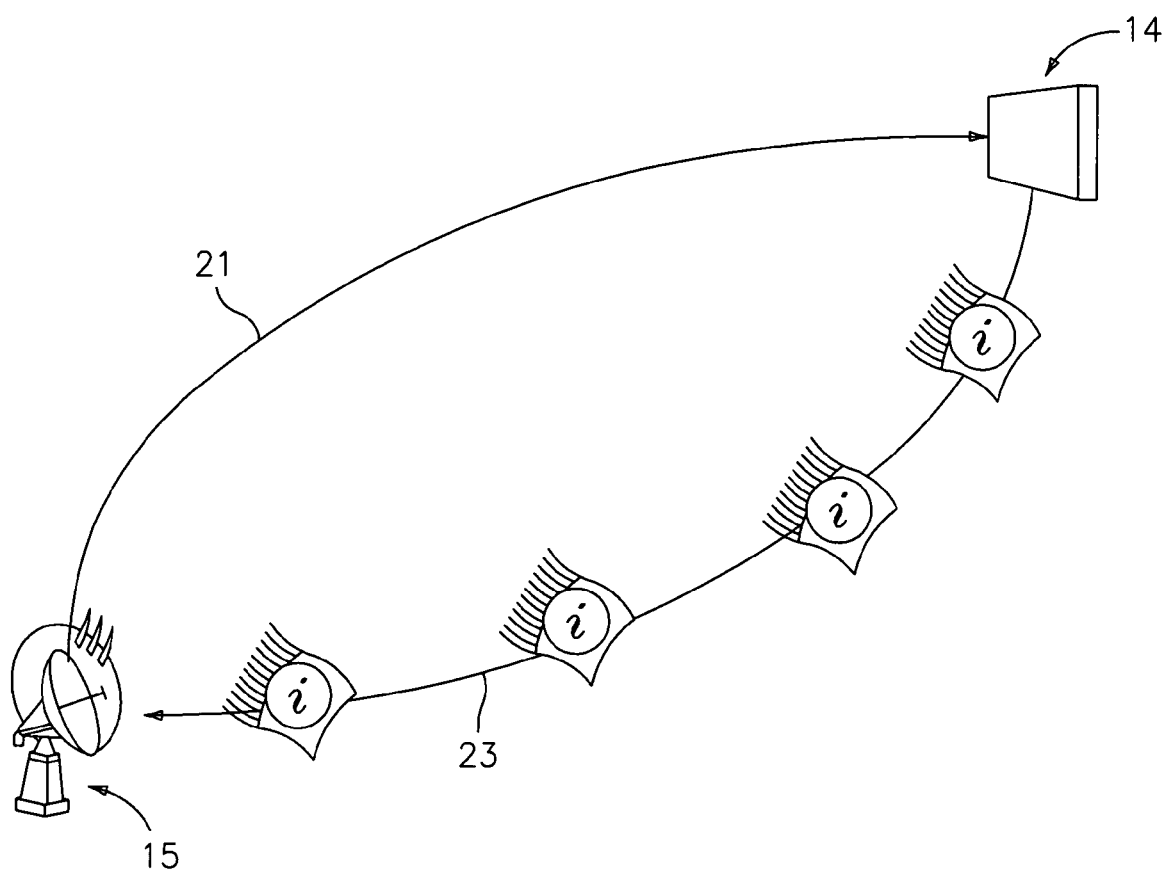
FIG. 2 is a diagram showing the location in operation of the sensor and reader systems of the present invention.
Figure 2A:
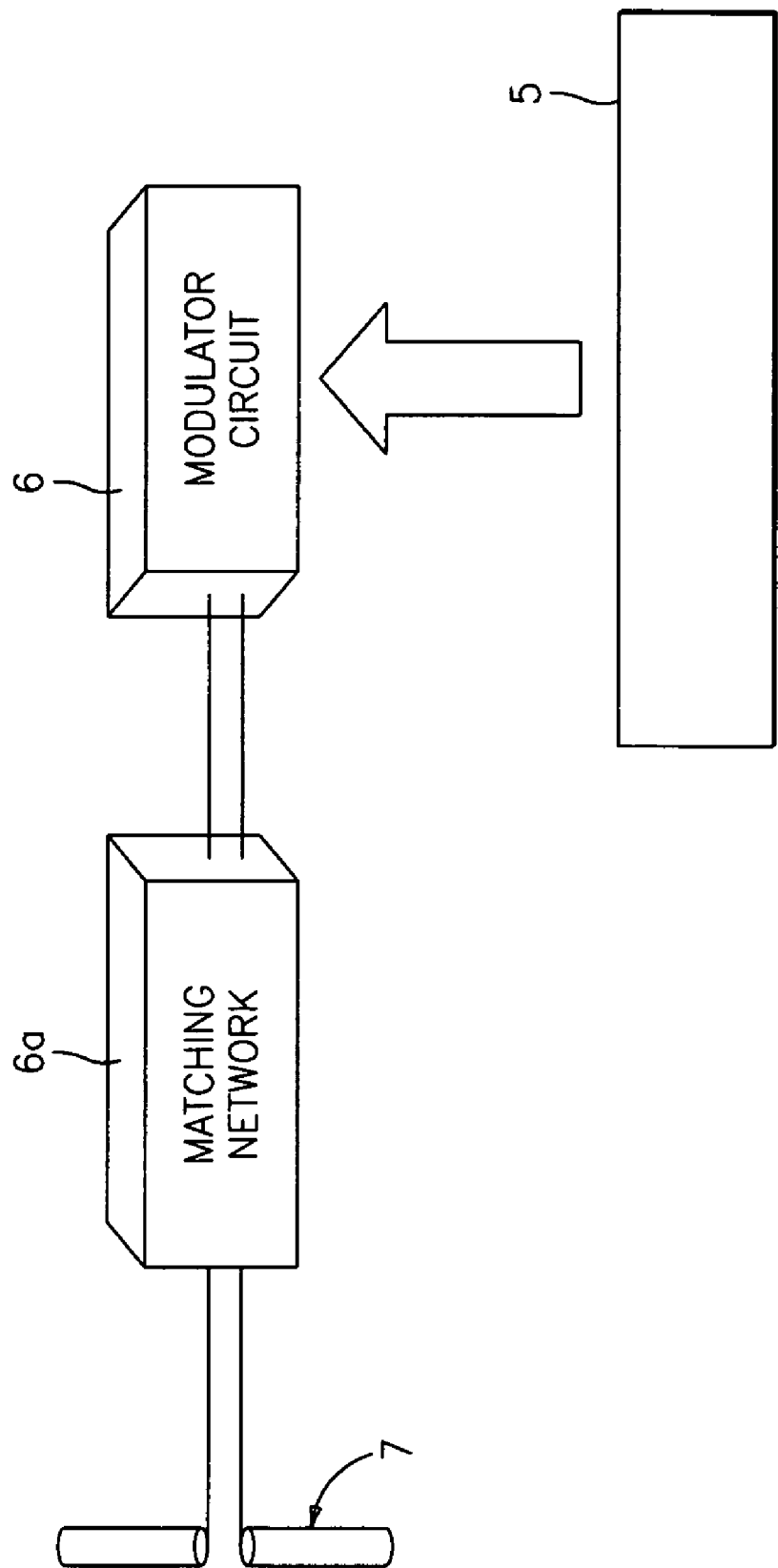

With reference to FIG. 2, there is illustrated the general configuration of the present invention. In a preferred embodiment, each of a plurality of sensor systems 14 is read by an emitted RF signal 21 that is reflected from sensor system 14 as a reflected RF signal 23. The emitted RF signal 21 is emitted by a reader system 15 and the reflected RF signal 23 is read by the reader system 15. The emitted RF signal 21 can be constructed using low power consumption CMOS components and only passive RF components. Phase modulation of the reflected RF signal 23 can be accomplished with a single P-N junction device located on each sensor system 14 that is selected to have a minority-carrier lifetime that is long compared with a period of the emitted RF signal 21. The RF signal does not radiate at any frequency unless it is receiving an emitted RF signal 21 from a reader 15. Further, the phase modulation imposed on the reflected RF energy 23 comprises a pseudo-random code that is known to the reader 15 and cannot easily be detected by an alien reader. Bi-phase modulation is chosen because the Fourier frequency components of the reflected signal ideally does not include a frequency component at the incident carrier frequency and the sensor apparatus will not appear as a target when illuminated by a radar. In this way, a sensor can remain electromagnetically quiet even when it is interrogated by a reader emitting an RF signal.

An antenna with a reactively terminated feed is highly reflective in its band of operation and will have a radar cross-section approaching the capture area of the antenna. If the angle of the feed termination reflection coefficient is bi-phase modulated between two angles separated by approximately 180 degrees while the magnitude of the reflection coefficient remains close to unity, then the reflected double sideband suppressed carrier signal will be nearly the same power as the received carrier signal and will contain the data frame imposed by the sensor modulator. A properly designed reader receiver can detect the bi-phase modulation on the reflected RF signal, which will contain any information encoded into the feed-termination reflection-coefficient angle modulation.

The angle of an antenna feed-termination reflection coefficient can be bi-phase modulated by a suitably imbedded PN diode structure using simple low-power CMOS logic. The RF properties of a PN diode are dependent on the diode's minority-carrier lifetime. The state of the device is modulated at frequencies below the reciprocal of the minority-carrier lifetime. At frequencies above the reciprocal of the minority carrier lifetime, the device appears to be a low-loss capacitor, which is either very small or very large depending on whether the PN diode is biased in the forward direction or in the reverse direction. Thus, a properly chosen PN diode could be two-state modulated at frequencies up to several tens of MHz using a low-power CMOS driver circuit and "look" like a two-state switched capacitor to a microwave signal.

In a preferred embodiment, the sensors are deployed in an expeditionary sensor grid and are periodically monitored by over flying the sensors with a remotely managed unmanned aerial vehicle, UAV, equipped with a suitable reader. The UAV can link the sensor information directly with a regional data-fusion center.

Figure 1:
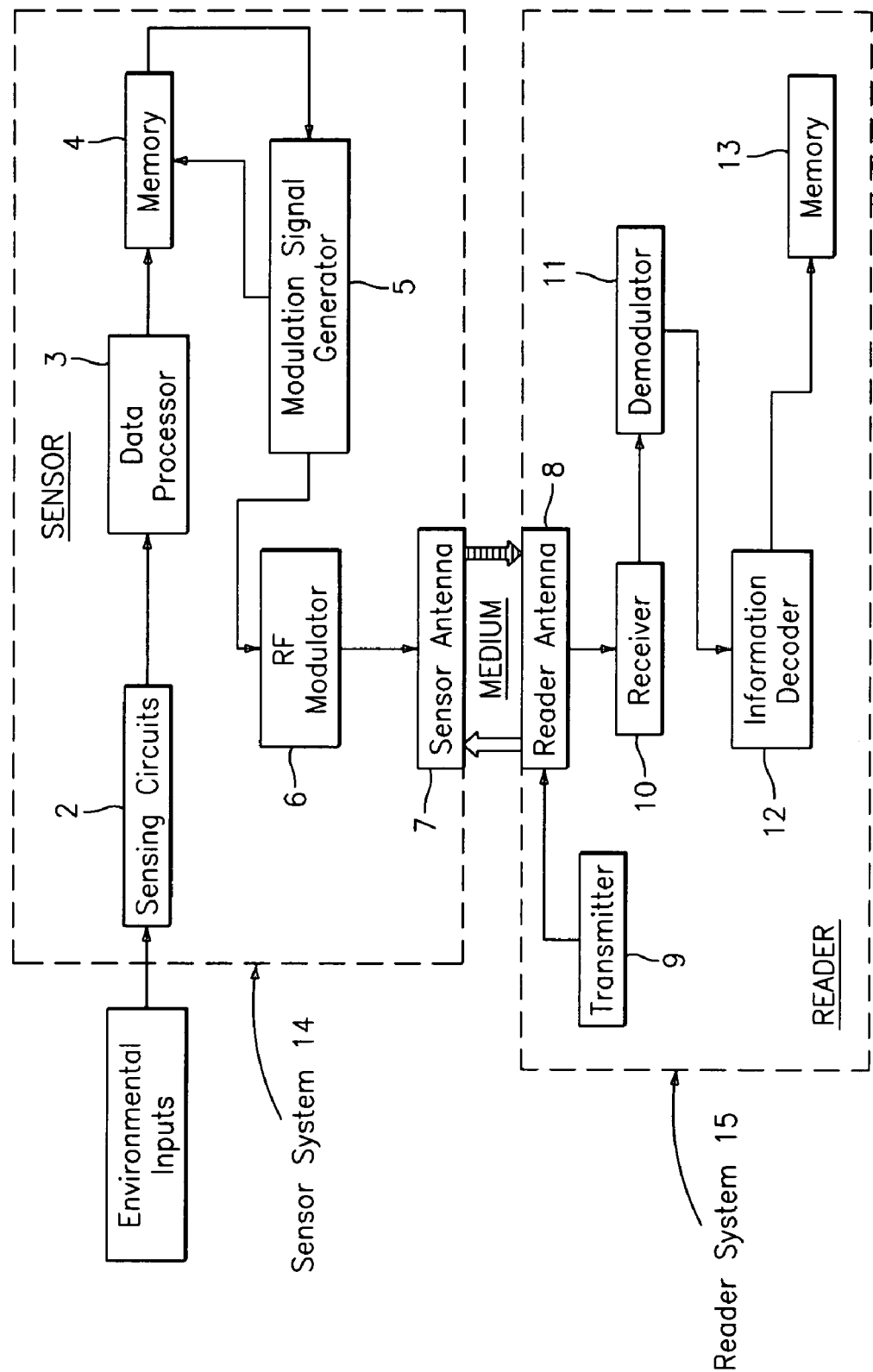
FIG. 1 is a block diagram of the components of the sensor and reader systems of the present invention.

A preferred embodiment of the remotely readable sensor system is illustrated in FIG. 1. The system comprises a sensor system 14 and a reader system 15. The reader system 15 acquires information from the sensor system 14 across a medium by transmitting an RF signal that is received, phase modulated, and re-transmitted by the sensor system 14.

Environmental inputs 1 are collected by the sensing circuits 2 and formatted as digital data. Environmental inputs may include, but are not limited to, temperature, motion, latitude, longitude, and sound data. A data processor 3 collects the data, appends local information, and writes the collected data into a First In First Out (FIFO) memory 4 according to a preset timing algorithm. The memory 4 stores a single frame of data representing a sliding time interval. For example, the sensor may collect a data set within each time interval, T, and the memory may store N data sets representing one frame. Then, the time interval represented by a memory frame extends back in time for a period equal to N×T. Each time a new data set is loaded into memory 4 by the data processor 3, the oldest data set is discarded.

The modulation signal generator 5 reads the current data frame stored in memory 4, applies a pre-amble and a post-amble to create a data packet, encodes the data packet, and constructs a modulation sequence that is used to drive the RF bi-phase modulator 6. The process of encoding the data packet may involve encryption. The modulation signal generator 5 continues to drive the RF modulator 6 with the current packet until a time interval T has passed and a new data set has been loaded into memory 4. Then, the cycle begins anew.

The RF modulator functions by changing the angle of the reflection coefficient presented to the sensor antenna 7. Changing the bias on a P-N junction device that terminates the antenna feed line changes the reflection-coefficient angle. The P-N junction device is modulated between two different reactive states by a two-state signal supplied by the modulation signal generator 5. The two reactive states of the P-N junction device are mapped into two reflection-coefficient states that have substantially equal magnitude and substantially opposite phase [phase differs by about 180 degrees]. A passive two-port matching network accomplishes the mapping.

The P-N junction device used in the RF Modulator 6 is chosen to have a minority-carrier lifetime that is short compared to the highest modulation frequency and long compared to a period of the RF signal transmitted by the reader system 15. Thus, the device state is easily changed by the modulator signal using very little power and the device absorbs very little of the RF power transmitted by the reader 15.

The reader transmitter 9 generates a carrier signal that may be frequency or phase modulated and may be pulsed. The carrier signal is fed to the reader antenna 8 and directed to the sensor antenna 7. The antennas 7,8 may or may not be directional. However, the reader transmitter 9, reader antenna 8 and reader receiver 10, taken together, have a minimum detectable sensor-antenna capture area at the range of the sensor antenna 7 that is dependent on the effective radiated power of the reader transmitter in the direction of the sensor apparatus. Then, in order for the reader 15 to be able to read a sensor 14, the antenna capture area of the sensor antenna 7, in the direction of the reader antenna 8 must be greater than the minimum detectable sensor antenna capture area of the reader system in the direction of the sensor 14.

In operation, the reader-transmitted signal arrives at the sensor antenna 7, is bi-phase modulated by the RF modulator 6 and reflected to the reader antenna 8. The path loss associated with this process is significant and is similar to the path loss associated with radar detection of an object at the range of the sensor apparatus that has a radar cross section equal to the capture area of the sensor-apparatus antenna 7. The path loss increases at least as fast as the fourth power of the separation between the reader transmit-and-receive antennas 8 and the sensor antenna 7.

The maximum range at which a sensor apparatus can be read is dependent on the magnitude of the reader-transmitter 9 effective radiated power in the direction of the sensor apparatus and range can be increased by increasing transmitter power or by moving the reader transmitter 9 closer to the sensor apparatus. The reader transmitter 9 and the reader receiver 10 may be in different locations in some embodiments. The reader-transmitter 9 may collect data frames within its field of view from a plurality of sensor apparatus in one read interval. A read interval, as used herein, is defined as the time interval for a plurality of sensors to respond to a single read signal sent out from the reader-transmitter 9 within its field of view. Experimentation with one embodiment of the present invention shows that an average read interval is about ten seconds. In another embodiment, the reader transmitter 9 may be replaced by a local signal of opportunity, such as a weather radar signal of the signal of a television broadcast. The reader receiver 10 processes the return signal and separates out the sidebands that are a result of the modulation introduced by the sensor 14. The sidebands are separated in frequency from the carrier signal generated by the transmitter 9 by an extent that exceeds the extent of the clutter spectrum plus the Doppler spectrum expected from the sensor environment. The receiver 10 also removes any transmitter modulation and Doppler shift so that the encoded modulation sidebands sent to the demodulator 11 are a close replica of the modulation sidebands generated by the sensor-apparatus RF modulator 6. The demodulator 11 detects the current data packet and sends it to the information decoder 12 where the data frame is recovered. Each new data frame is stored in a local memory 13 for transmission to a data fusion center. Low-power circuits, CMOS for example, may be used in the sensors of the present invention in order to extend the battery life of a TAG that is designed in the subject manner. Further, a sensor apparatus may be located where energy harvesting techniques can extend sensor-apparatus life indefinitely. The sensor apparatus does not radiate at any frequency but can be read remotely by reader that has been designed to detect the bi-phase modulation on the reflected RF signal. Any digital sensor-apparatus response can be encrypted to avoid unwanted detection. The sensor-apparatus can be completely self-contained and can be made as small as the minimum sensor-antenna capture area observable by the reader system.

In an alternative embodiment, one or more co-located wireless other-sensor means can modify the information encoded in the sensor-apparatus memory if an other-sensor wireless receiver is included in the sensor apparatus to receive the new information. In this way, a sensor-apparatus of the present invention can be used to gather and fuse data from nearby wireless sensors.

In addition, the entire sensor apparatus can be disguised as a covert adjunct to any object of interest and would only be detectable electronically at the correct sideband of a reflected RF signal. The modulation may be spread in spectrum such that it is nearly unobservable.

Figure 3:
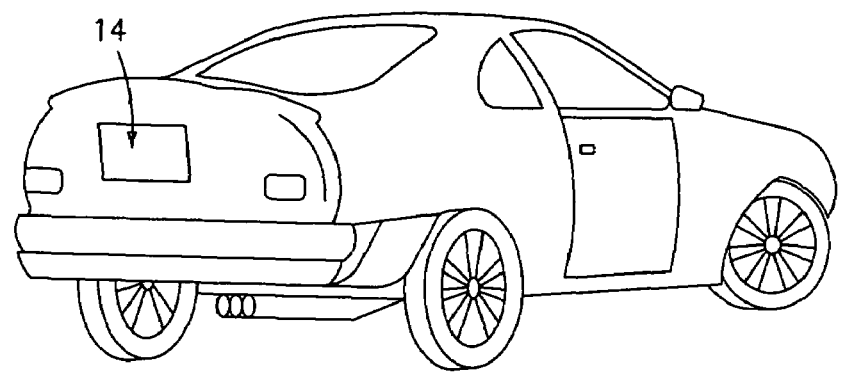
FIG. 3 is an illustration of a sensor system of the present invention affixed to a vehicle.
Figure 4:
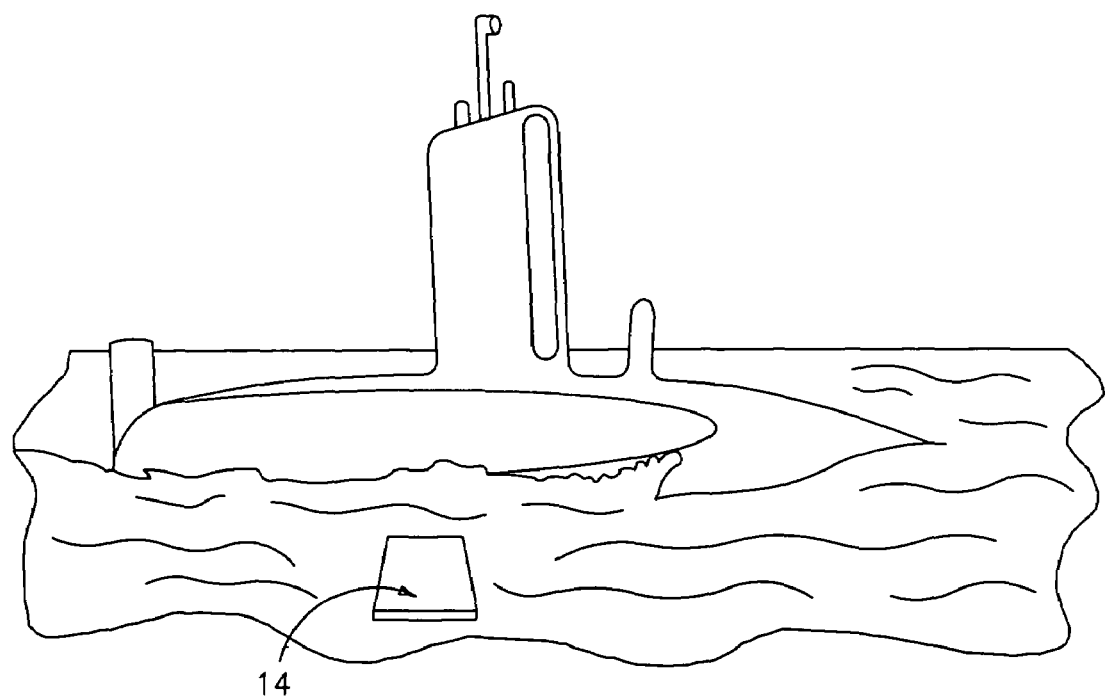
FIG. 4 is an illustration of a sensor system of the present invention deployed upon a body of water.

The sensors of the present invention can be affixed to a vehicle. With reference to FIG. 3, there is illustrated an embodiment wherein the sensor system 14 takes the form of a license plate. Such a license plate can be "read" by reader mounted on the front of a following car in order to gather information about a particular vehicle. Wireless other sensors within the vehicle could relay information to the license-plate sensor apparatus, which could then be recovered by a reader. With reference to FIG. 4, there is illustrated an alternative embodiment wherein the sensor apparatus 14 is fashioned to float on the surface of a body of water.

What is claimed is:

1. A remotely readable sensor apparatus, comprising:
   a sensor system having a minimum detectable sensor-apparatus antenna capture area, comprising:
   at least one sensing circuit for converting environmental input data to digital data;
   a data processor for receiving said digital data and appending additional information thereto to form encoded data;
   a memory means for storing said encoded data as a data frame;
   a modulation signal generator for receiving said data frame stored in said memory means, forming a data packet therefrom and outputting a modulation sequence;
   an RF bi-phase modulator for receiving said modulation sequence; and
   a sensor-apparatus antenna having a detectable capture area and a reflection coefficient that is determined by the states of said RF bi-phase modulator;
   whereby said RF bi-phase modulator is driven by said modulation sequence to change said reflection coefficient angle by a P-N junction device, and to produce a reflected signal in response to a carrier signal; and
   a reader system, comprising:
   a reader transmitter for generating said carrier signal;
   a reader transmitting antenna for transmitting said carrier signal to said sensor-apparatus and reader receiving antenna for receiving said reflected signal from said sensor-apparatus;
   a reader receiver for processing said reflected signal to form a processed reflected signal;
   a demodulator for receiving said processed reflected signal and outputting said encoded data;
   an information decoder for decoding said encoded data to retrieve said data frame; and
   a local memory for storing said data frame.

2. The remotely readable sensor apparatus of claim 1, wherein said memory means is a FIFO memory.

3. The remotely readable sensor apparatus of claim 1, wherein said storage means stores said data frame at least at one predetermined time.

4. The remotely readable sensor apparatus of claim 3, wherein said at least at one predetermined time is generated by a preset timing algorithm.

5. The remotely readable sensor apparatus of claim 1, wherein said data packet comprises said data frame, a pre-amble and a post-amble.

6. The remotely readable sensor apparatus of claim 1, wherein said P-N junction device is modulated between two different reactive states so as to change said reflection coefficient angle.

7. The remotely readable sensor apparatus of claim 6, wherein said modulation is a two-state signal.

8. The remotely readable sensor apparatus of claim 7, wherein said two different reactive states are mapped into two reflection-coefficient states each substantially equal in magnitude and substantially opposite in phase.

9. The remotely readable sensor apparatus of claim 7, further comprising a passive two-part matching network for mapping said two different reactive states.

10. The remotely readable sensor apparatus of claim 1, wherein said P-N junction device has a minority-carrier lifetime shorter than a highest modulation frequency and longer than a period of said carrier signal.

11. The remotely readable sensor apparatus of claim 1, wherein said carrier signal is modulated.

12. The remotely readable sensor apparatus of claim 1, wherein said carrier signal is pulsed.

13. The remotely readable sensor apparatus of claim 1, wherein said sensor antenna is directional.

14. The remotely readable sensor apparatus of claim 1, wherein said sensor system is affixed to a vehicle.

15. The remotely readable sensor apparatus of claim 1, wherein said sensor system floats on the surface of a body of water.

16. The remotely readable sensor system of claim 1 wherein one reader, having a field of view, collects data frames from a plurality of sensor apparatus located within the field of view in one read interval.

17. The remotely readable sensor apparatus of claim 16 wherein the reader transmitter and the reader receiver are independently located.

18. The remotely readable sensor apparatus of claim 1 wherein the reader transmitter and the reader receiver are independently located.

19. A method for remotely sensing environmental data comprising the steps of:
   collecting a plurality of environmental inputs via at least one sensing means;
   formatting said plurality of environmental inputs as digital data;
   collecting said digital data;
   storing said collected digital data in a memory storage device as a data frame, said memory storage device accessible by a sensor system having a sensor antenna;
   constructing a data packet from said data frame;
   encoding said data packet to construct a modulation sequence;
   driving an RF modulator with said modulation sequence;
   generating a carrier signal with a reader transmitter and directing said carrier signal at said sensor antenna;
   receiving said carrier signal at said sensor system via said sensor antenna;
   bi-phase modulating said received carrier signal to produce a reflected signal;
   receiving said reflecting signal with a reader receiver;
   processing said reflected signal to produce a processed signal;
   decoding said processed signal to produce said data packet; and
   recovering said data frame from said data packet.

20. The method of claim 19, wherein the step of collecting said digital data further comprises the step of appending local information to said digital data.

21. The method of claim 19, wherein the step of constructing said data packet comprises the additional steps of:
   reading said data frame from said memory storage device; and
   applying a preamble and a post-amble to said data frame to form said data packet.

22. The method of claim 21, comprising the additional step of sending said recovered data frame to a data fusion center.

23. A remotely readable sensor apparatus, comprising:
   a sensor system having a minimum detectable sensor-apparatus antenna capture area, comprising:
   at least one sensing circuit for converting environmental input data to digital data;
   a data processor for receiving said digital data and appending additional information thereto to form encoded data;
   a memory means for storing said encoded data as a data frame;
   a modulation signal generator for receiving said data frame stored in said memory means, forming a data packet therefrom and outputting a modulation sequence;
   an RF bi-phase modulator for receiving said modulation sequence; and
   a sensor-apparatus antenna having a detectable capture area and a reflection coefficient that is determined by the states of said RF bi-phase modulator;
   whereby said RF bi-phase modulator is driven by said modulation sequence to change said reflection coefficient angle by a P-N junction device, and to produce a reflected signal in response to a carrier signal; and
   a reader system, comprising:
   a local signal of opportunity for generating said carrier signal;
   a reader transmitting antenna for transmitting said carrier signal to said sensor-apparatus and reader receiving antenna for receiving said reflected signal from said sensor-apparatus;
   a reader receiver for processing said reflected signal to form a processed reflected signal;
   a demodulator for receiving said processed reflected signal and outputting said encoded data;
   an information decoder for decoding said encoded data to retrieve said data frame; and
   a local memory for storing said data frame.

24. The remotely readable sensor apparatus of claim 23, wherein the local signal of opportunity is selected from the group of a weather radar signal and a television broadcast signal.

* * * * *